July 26, 1938.  R. INGHAM  2,125,112

ICE CREAM ENROBER

Filed Sept. 24, 1937

WITNESSES

INVENTOR
Richard Ingham
BY
Anderson + Liddy
ATTORNEYS

Patented July 26, 1938

2,125,112

UNITED STATES PATENT OFFICE 2,125,112

ICE CREAM ENROBER

Richard Ingham, Nashua, N. H.

Application September 24, 1937, Serial No. 165,460

4 Claims. (Cl. 91—6)

This invention relates to devices for coating ice cream or other substances and has for an object to provide an improved construction wherein a plurality of objects may be coated or enrobed at the same time.

Another object of the invention is to provide a device which will engage blocks of ice cream or other objects that are arranged in contact, separate the blocks, and then act as dipping means therefor.

Figure 1:
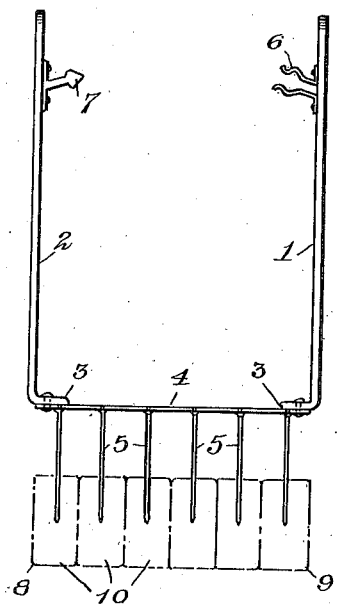
Fig. 1 is a front elevation of an enrober disclosing an embodiment of the invention, a row of blocks being shown in dotted lines in connection therewith.
Figure 2:
Fig. 2 is a side view of the structure shown in Fig. 1.

Referring to the accompanying drawing by numerals, 1 and 2 indicate a pair of handles which are preferably identical and may be made from wood, metal, or other material. Preferably they are made of rather stiff metal and each provided with an inturned foot 3 so that the flexible flat strip 4 may be riveted or otherwise rigidly secured thereto as shown in Fig. 1. The strip 4 is preferably a good grade of flexible resilient steel and to this strip is connected a plurality of pairs of pins 5. These pins may be welded or otherwise rigidly secured to the strip 4. Preferably the strip 4 is provided with an aperture through which the pins extend and then the parts welded together so that the strips will be permanently and firmly secured in place.

Figure 3:
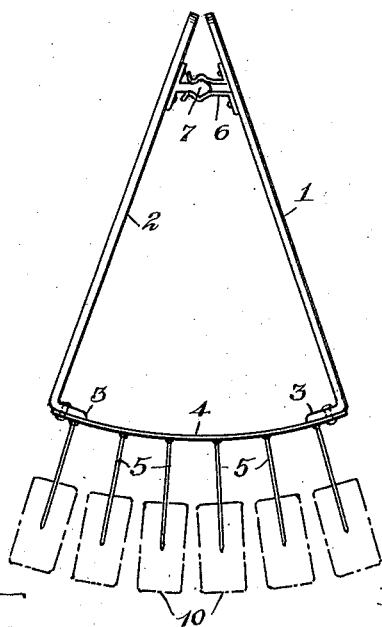
Fig. 3 is a view similar to Fig. 1 but with the parts actuated to separate the blocks.

At the end opposite strip 4 there is provided a catch formed with a socket 6 and a headed member 7 adapted to engage the member 6 and be held thereby when the arms 1 and 2 are brought together as shown in Fig. 3. The catch is caused to interlock by merely pressing the parts together and is caused to be released by merely pulling the parts away from each other. It will therefore be understood that member 6 is resilient while member 7 is preferably rigid.

The device is intended to hold different articles which are to be dipped into a coating solution so as to be properly coated over their entire surfaces. In coating blocks of ice cream with chocolate various means have been provided to perform this action properly and with expedition. In the present instance the ice cream may be formed in blocks extending from point 8 to point 9 and then cut into small blocks 10. These small blocks are to be left in their original position and then the pins 5 pressed downwardly into the blocks as shown in Fig. 1. It will be noted that there will be two pins pressed into each block. The pins 5 may be pointed and round in cross section or of other shape as preferred.

After the pins have been inserted as shown in Fig. 1, the arms 1 and 2 are swung to the position shown in Fig. 3. This will immediately and automatically equally separate all the blocks 10. These blocks are then dipped into the chocolate solution and immediately removed. This completes the coating of the chocolate blocks and they may then be removed from the pins by a pulling or pushing action exerted by any desired kind of implement. If preferred they could be left in place until the chocolate has set and then removed. After the chocolate on the blocks has set the blocks may then receive a supporting handle of wood if desired, or may be merely wrapped in a suitable wrapping and stored away for future use or sale.

In Fig. 1 six blocks have been shown with an instrument made of a proper size to take care of all these blocks. It will be evident, however, that a greater number or less number of blocks might be accommodated by increasing or decreasing the number or pairs of pins 5. Also instead of having a pair of pins 5 for each block 10, one pin could be used, and when this is done preferably the pin is flat or substantially rectangular in cross section with the parts so formed that the pin will penetrate the block centrally.

I claim:

1. An ice cream enrober comprising a pair of comparatively stiff arms, a flexible member connecting said arms, and pins extending from said flexible member at right angles thereto adapted to be inserted into blocks of ice cream to be dipped, and means including said arms for holding said flexible member in its flexed position.

2. An enrober for ice cream blocks comprising a pin for each of said blocks, a flexible bar rigidly secured to one end of said pins, and a pair of stiff arms, one end of the respective arms being rigidly secured respectively to the ends of said flexible bar, said arms being adapted to have their free ends swung toward each other for bowing said flexible bar so as to separate the outer ends of said pins and any ice cream blocks arranged thereon.

3. An enrober for ice cream blocks comprising a flexible bar, a plurality of pairs of pins extending normal thereto, each pair of pins being adapted to receive an ice cream block, a pair of stiff handles having at one end an inturned foot, said feet being rigidly secured to the ends of said flexible bar, and means at the free ends of said handles for holding said free ends adjacent to each other after said handles have been moved for bowing said flexible bar.

4. An enrober for ice cream blocks comprising a flexible bar, a pin for each block, said pins having one end secured to said bar in spaced relation to each other, an actuating arm rigidly secured to each end of said bar, and a disengageable fastener for holding the free ends of said arms normally together so as to maintain said bar taut and the blocks of ice cream on said pins spaced apart.

RICHARD INGHAM.